United States Patent [19]

Ohno et al.

[11] Patent Number: 5,412,626
[45] Date of Patent: May 2, 1995

[54] METHOD OF RECORDING OPTICAL INFORMATION WITH SELECTIVE CORRECTION IN PULSE WAVEFORM AND A RECORDING SYSTEM THEREFOR

[75] Inventors: Eiji Ohno; Kenichi Nishiuchi, both of Osaka; Kenichi Nagata, Nishinomiya; Noboru Yamada, Osaka; Nobuo Akahira, Yawata, all of Japan

[73] Assignee: Matsushita Electric Industrial Co., Ltd., Osaka, Japan

[21] Appl. No.: 36,198

[22] Filed: Mar. 23, 1993

[30] Foreign Application Priority Data

Mar. 23, 1992 [JP] Japan ................................ 4-064524

[51] Int. Cl.⁶ .......................... G11B 11/00; G11B 7/00
[52] U.S. Cl. .................................... 369/13; 369/100
[58] Field of Search ............... 369/13, 32, 116, 100, 369/109, 59, 124, 48, 43, 47, 111; 250/201; 358/342

[56] References Cited

U.S. PATENT DOCUMENTS 5,003,527 3/1991 Matsumoto et al. ............. 369/100
5,109,373 4/1992 Ohno et al. ..................... 369/100

*Primary Examiner*—Georgia Y. Epps
*Assistant Examiner*—Ali Neyzari
*Attorney, Agent, or Firm*—Ratner & Prestia

[57] ABSTRACT

In a method of recording optical information, one of correcting ways for correcting the pulse waveform of the input signal to be recorded is selected depending on change in relative velocity between the optical information recording medium and the laser beam spot; and thereafter the laser beam output power is modulated in a range between an erasing level and a recording level in accordance with the corrected pulse waveform of the modulated input signal. Then a digital input signal corrected by modulation in pulse width is overwritten onto an optical information recording medium with a single laser beam spot by forming recording marks corresponding to the input pulse signal.

17 Claims, 8 Drawing Sheets

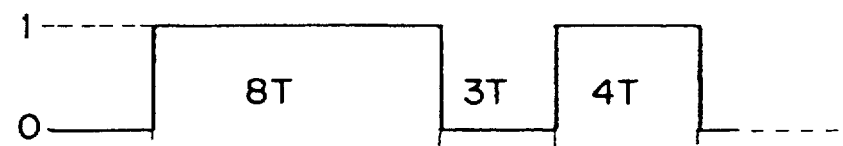
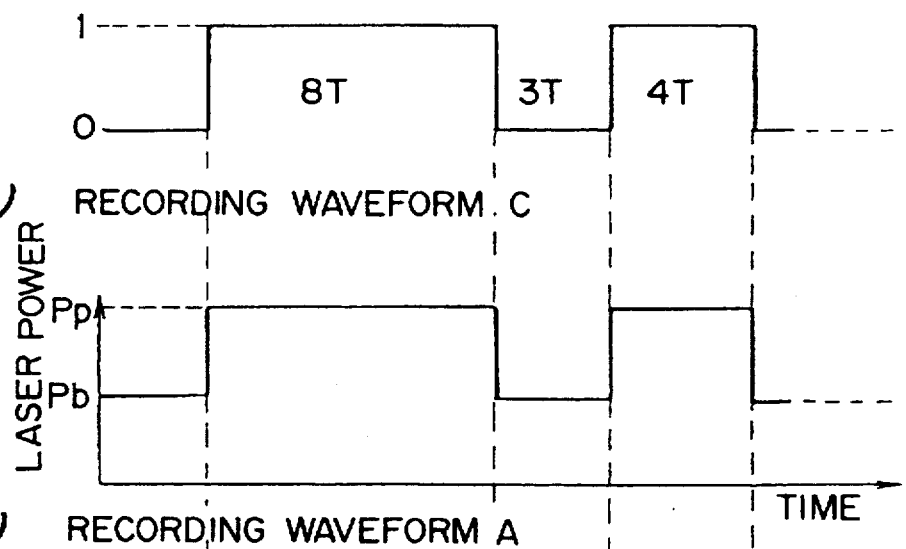
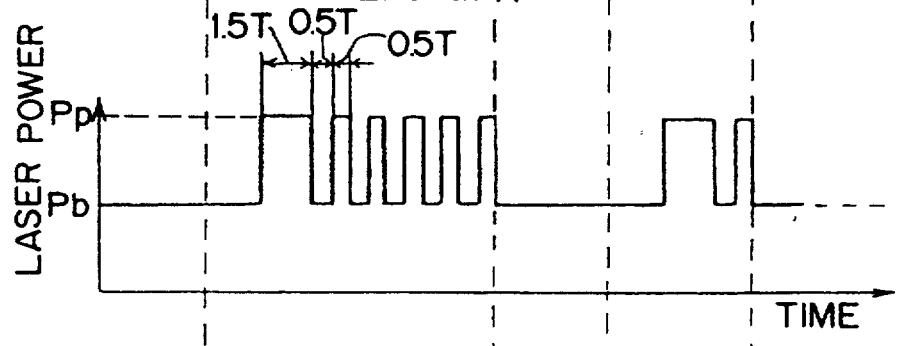
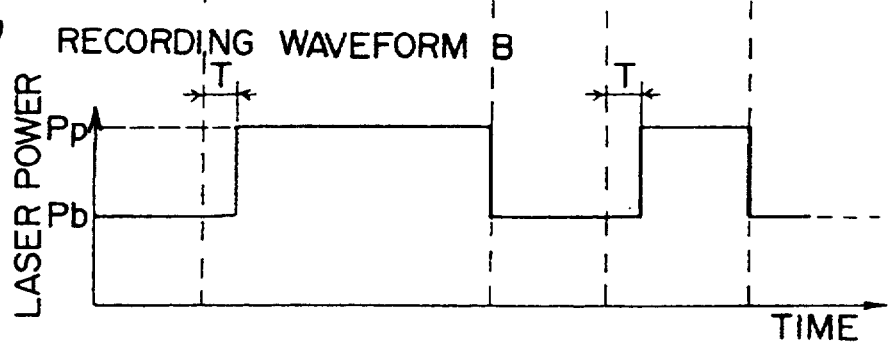

Fig. 6(a) RECORDING WAVEFORM D
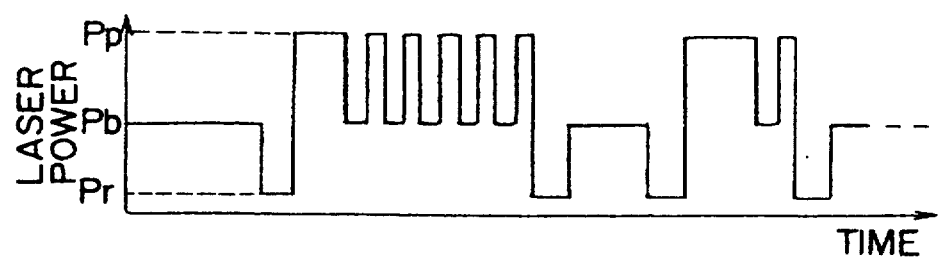
Fig. 6(b) RECORDING WAVEFORM E
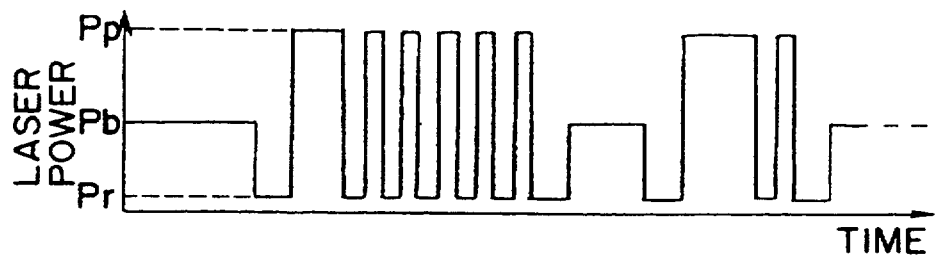

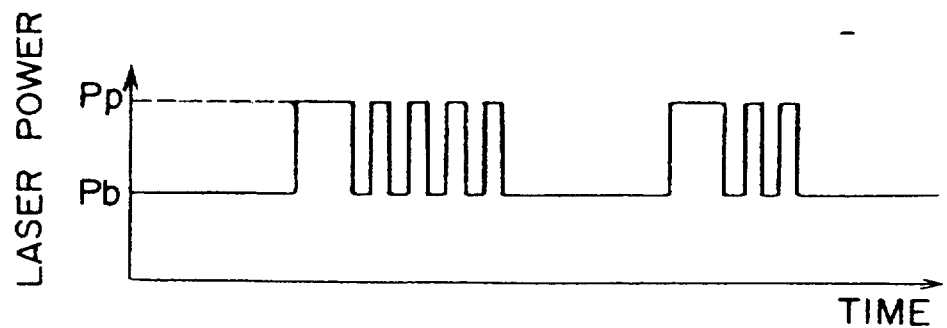
Fig. 8(a) RECORDING WAVEFORM F
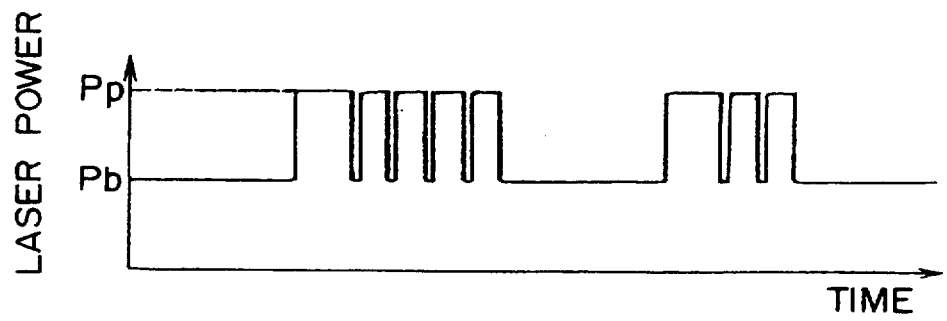
Fig. 8(b) RECORDING WAVEFORM G

RECORDING MARK

METHOD OF RECORDING OPTICAL INFORMATION WITH SELECTIVE CORRECTION IN PULSE WAVEFORM AND A RECORDING SYSTEM THEREFOR

BACKGROUND OF THE INVENTION

1. Field of the Invention

The present invention relates to a method of recording optical information and an optical recording system for recording optical information onto an optical data recording medium, primarily an optical disc which has a function of recording and reproducing optical data at a high speed with high density by using a single laser beam and the like.

2. Description of the Prior Art

There have been known techniques of recording and reproducing optical data at a high speed with high density by using a laser beam, which have been put into practical use primarily as optical discs. The optical discs can be briefly classified into three broad categories, i.e., read-only (reproduction exclusive), write-once read-many (additional writing), and rewritable types. The read-only discs have been commercialized as compact discs for recording audio data, or as laser video discs for recording video data. The write-once read-many discs have been commercialized as document files, still image files, and the like. At present, research and development are being advanced, focused on the rewritable discs, which are increasingly commercialized as data files for personal computers and the like.

The rewritable optical disc incorporates a recording thin film having an optical characteristic that a reversible change between two or more states is induced when there is a change in irradiation conditions of laser beams or the like. The rewritable optical discs are typically classified into two types, i.e., magneto-optical type and phase-change type.

In the magneto-optical type, a ferromagnetic thin film is used as the recording thin film, so that a signal is recorded by changing the orientation of the magnetic domain.

In the phase-change type optical discs, a recording operation of optical signals is performed in such a manner that the recording film is changed in phase reversibly between an amorphous phase and a crystalline phase by changing the irradiation conditions of the laser beam thereby to record the optical data in the optical disc, while a playback operation of recorded data is performed by optically detecting differences in optical reflectance between the amorphous and crystalline phases of the recording film thereby to reproduce the recorded data. Accordingly, the phase-change type optical discs are capable of reproducing a recorded data signal as a change in reflectance of a laser beam, in the same manner as in the read-only type and the additional writing type discs. Besides, the phase-change type optical discs advantageously allow the optical recording system construction to be simplified by virtue of its capability of overwriting with a single laser beam by modulating the laser power between an erasing level and a recording level thereof.

As a method of recording optical data signals onto a rewritable optical disc already commercially available, there is employed in most cases a pulse position modulation method (hereinafter, abbreviated as "PPM"), in which the positions of individual recording marks each corresponds to a level "1" of the digital signals to be recorded. However, for further enhanced density, the pulse-width modulation (hereinafter, abbreviated as "PWM") is now under discussion, where the edge positions at the front and rear of a recording mark each corresponds to the level "1" of the digital signals. It is noted-here that the front edge corresponds to the laser beam irradiation starting portion of the recorded mark while the rear edge corresponds to the laser beam irradiation ending portion of the recorded mark.

In the PWM system, since the width of the recorded mark carries optical data, it is necessary that the recorded mark be free from distortion in width, in other words, the recorded mark should have a symmetrical shape between the leading edge and the trailing edge thereof. However, in a recording operation of recording an optical data signal onto an optical disc, in a laser beam application portion of the recording film, there is caused a higher temperature portion at the trailing edge where the laser beam irradiation is ended due to a heat accumulation effect and there is caused a lower temperature portion at the leading edge where the laser beam irradiation is started. That is, the achieved temperature of the recording film is relatively low at the front and gradually increases toward the rear due to the effects of preheating. Therefore, the recorded mark is made wider at the trailing edge than at the leading edge, so that there is a problem that the shape of the recorded mark is narrower at the leading edge and wider at the trailing edge, resulting in distorted in a shape of tear-like drop. This would cause a distortion of a playback signal waveform, such that in some cases a recorded signal could not be correctly reproduced.

Therefore, the inventors of the present invention proposed an overwriting recording method as disclosed in the U.S. Pat. No. 5,109,373 which is assigned to the same assignee as the present application. In this U.S. Patent, one recorded mark is formed by irradiation of a laser beam with a plural-short-pulse string for reducing the aforementioned distortion of a recorded mark. This method, however, has involved with a possible problem that, if a relative velocity of a laser beam spot differs with respect to a position of the disc surface, for example, between inner and outer circumferences of the disc surface when the optical disc is rotated with a constant speed, there may arise lack of laser power especially in the outer circumference region where the relative velocity of a laser beam spot is high, involving a difficulty in circuit design, to a newly developed problem.

In more detail, with reference to FIGS. 9(a) through 9(d), in the conventional methods, first described is the cause of the fact that the recording mark distorts into a tear-like shape when optical data is recorded onto an optical recording disc. FIG. 9(a) shows a waveform of an input digital signal to be recorded having pulse duration periods and pulse spacing periods. In the first conventional method, as shown in FIG. 9(b), the recording input signal is directly converted into a laser beam output modulation power by modulating the laser output power level in a range between an erasing power level Pb and a recording power level Pp, where the pulse duration periods of the input signal directly correspond to the recording power level Pp while the pulse spacing periods correspond to the erasing power level Pb.

In this case, as shown in FIG. 9(c), the achieved temperature of the recording film of the optical disc would be higher at the laser irradiation ending portion of the recorded mark than at the laser irradiation starting portion of the recorded mark due to the heat accumulation effect (i.e., preheating effect). The laser irradiation ending portion corresponds to the trailing edge of the recorded mark, while the laser irradiation starting portion corresponds to the leading edge of the recorded mark. As a result, the shape of the recorded mark would be wider at the trailing edge than at the leading edge to be distorted into a tear-like shape, as shown in FIG. 9(d). Since the heat accumulation effect will increase with lowered relative velocity between the optical disc and the laser beam spot (hereinafter, referred to as "linear velocity"), therefore the tear-like distortion also enlarges with lowered linear velocity. This tear-like distortion would cause a distortion in a playback signal waveform, and therefore it has been impossible in some cases to reproduce a recorded signal correctly.

In order to reduce such a tear-like distortion of recorded marks, the inventors of the present invention proposed an overwriting recording method in the U.S. Pat. No. 5,109,373 in which one recorded mark is formed by laser beam irradiation with a multiple-short-pulse string.

The second conventional overwriting method mentioned above is next explained with reference to FIGS. 10(a) through 10(d), where an input digital recording signal as shown in FIG. 10(a) is overwritten by a PWM method with conversion into a multiple-short-pulse string, thereafter modulating the laser output power level in a range between an erasing power level Pb (Low) and a recording power level Pp (High) as shown in FIG. 10(b) in accordance with the corrected input pulse string waveform. It is to be noted here that the short-pulse string consists of one leading pulse (head pulse) having a wider pulse width and a succeeding pulse string each having a narrower pulse width. The width of the leading pulse is made constant independently of the length of a recording mark, while the pulses in the succeeding pulse string are equal both in width and in interval to one another, where the number of the pulses contained in the succeeding pulse string is n-1 to form the n-th shortest entry recording mark in length where n is a positive integer.

For example, the 8–14 modulation signal (hereinafter, abbreviated as "EFM signal"), which is adopted for compact discs, is formed of pulses of nine types in length from 3 T to 11 T (T denotes a clock period, hereinafter). When the EFM signal is used as an input signal to be recorded, the shortest 3 T pulse is converted into a short-pulse string consisting of only the leading head pulse of 3 T in length without any succeeding pulse, the second shortest 4 T pulse is converted into a short-pulse string consisting of one leading pulse and one succeeding pulse, the third shortest 5 T pulse is converted into a short-pulse string consisting of one leading pulse and two succeeding pulses, and so on, and thus the longest (ninth shortest) 11 T pulse is converted into a short-pulse string consisting of one leading pulse and eight succeeding pulses. By such regularly arranged conversion, a signal conversion circuit can be simplified in construction. In this case, the achieved temperature of the recording film, as shown in FIG. 10(c), will be abruptly increased at the leading edge by the wider leading pulse, but thereafter suppressed from increasing at the trailing edge by laser power irradiation with the pulse string. In consequence, the shape of the recorded mark is at good symmetry between the leading and trailing edges as shown in FIG. 10(d), thus reducing the tear-like distortion in the recorded mark.

The above-described recording method of conversion into a multiple-short-pulse string is quite effective when the linear velocity is low or the recording frequency is low. However, for high linear velocities or high frequencies of recording signals, the method has proved to involve problems newly encountered.

When the recording signal waveform is converted into a plurality of short pulses, the energy of the laser output power applied to the recording film will be reduced as compared with the direct conversion method, requiring a greater recording power level Pp. This would not matter for lower linear velocities, but when greater recording power is required with higher linear velocity, a higher laser beam output power is required to be supplied to the recording film, resulting in an increased cost of the recording system.

Also, when converting the recording input signal into a pulse string of multiple short-width pulses, it is necessary to use a clock signal having a period of some integral fraction of the pulse period of the input signal (T for the aforenoted EFM signal). Thus, when an input recording signal is high in frequency, the frequency of the clock signal becomes too high to implement a circuit design of the recording system. Moreover, laser power output involves the greater distortion in waveform when such higher frequency modulation is done.

In general use of optical discs, the relative linear velocity of the laser beam spot becomes higher at the outer circumference than that at the inner circumference of the disc surface under the condition of a constant rotating speed, i.e., constant angular velocity of the optical disc (hereinafter, abbreviated as CAV). Further, in order to increase the recording density by equalizing the length of the recording mark between the inner and outer circumferences of the disc surface, there has been proposed a method for increasing the recording frequency higher toward the outer circumference. Besides, even in the case where an optical disc is rotated at a constant linear velocity in its all regions (hereinafter, abbreviated as CLV), when a different type of optical disc is used in the same recording system, it is necessary to vary the linear velocity and recording frequency depending on the type of the disc.

Thus, the present inventors, over investigations in details in view of the foregoing points, have found that, when in overwriting a pulse-width-modulated digital signal onto an optical disc by using a single laser beam spot, it is quite effective for solving the foregoing problems to correct the recording input signal into a modulation pattern for modulating a laser power waveform into an optimum shape depending on change in linear velocity.

SUMMARY OF THE INVENTION

Accordingly, an essential objective of the present invention is to provide an optical recording method for obtaining an enlarged recording capacity of an optical disc with an error rate reduced by forming less-distorted, successful recording marks over the whole region of the optical disc and accomplishing the recording with a jitter of a playback waveform suppressed small.

Another objective of the present invention is to provide an optical recording system for recording optical information onto an optical data recording medium for recording and reproducing optical data at a high speed with high density.

In order to achieve the aforementioned objectives, according to the present invention, there is provided a method of recording optical information in which a digital signal corrected by modulation in pulse width is overwritten onto an optical information recording medium having its optically discriminatable states reversibly changed by irradiation with a single laser beam spot thereby to form recording marks corresponding to the modulated input signal. The method comprises the steps of: selecting one of correcting ways for correcting the pulse waveform of the input signal to be recorded, depending on change in relative velocity between the optical information recording medium and the laser beam spot; and modulating the laser output power level in a range between an erasing level and a recording level in accordance with the corrected pulse waveform of the modulated input signal.

In order to facilitate the aforementioned method, according to the present invention, there is also provided a recording system for recording optical information in which a digital signal corrected by modulation in pulse width is overwritten onto an optical information recording medium having its optically discriminatable states reversibly changed by irradiation with a single laser beam spot to form recording marks corresponding to the input signal. The recording system comprises: a plurality of waveform correcting means for correcting a pulse waveform of an input signal to be recorded; means for detecting the position of the laser beam spot applied onto the optical information recording medium; means for selecting one of the plurality of waveform correcting means depending on the position of the laser beam spot detected by said position detecting means; and means for modulating the laser output power level in a range between an erasing level and a recording level in accordance with the corrected pulse waveform of the input signal.

According to the present invention, it is made possible with a practical recording system construction to record a pulse-width-modulated digital signal onto regions different in linear velocity on an optical disc, normally with less distortion of recording marks.

Moreover, according to the present invention, it is made possible to record a pulse-width-modulated digital signal onto discs of different types used at different rotating speeds, normally with less distortion of recording marks. By this advantage, distortion of a playback signal waveform is also reduced, thus allowing a high-density recording.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 3(a), 3(b), 3(c) and 3(d) are waveform diagrams showing recording waveforms adopted in the embodiments of the present invention;

FIGS. 6(a) and 6(b) are waveform diagrams showing a modified example of recording waveforms according to the present invention;

FIGS. 8(a) and 8(b) are waveform diagrams showing further another example of recording waveforms according to the present invention;

DETAILED DESCRIPTION OF THE PREFERRED EMBODIMENTS

The present invention is now described in more detail with reference to the accompanying drawings.

In the present invention, when a digital recording signal having pulse duration periods and pulse spacing periods is subjected to pulse-width-modulation and overwritten onto an optical disc by irradiation with a single laser beam, the recording input signal is selectively corrected in waveform into an optimum shape depending on change in linear velocity of the optical disc with respect to the laser beam spot. The laser output power modulation is produced in accordance with the modulated recording signals.

Figure 1A:
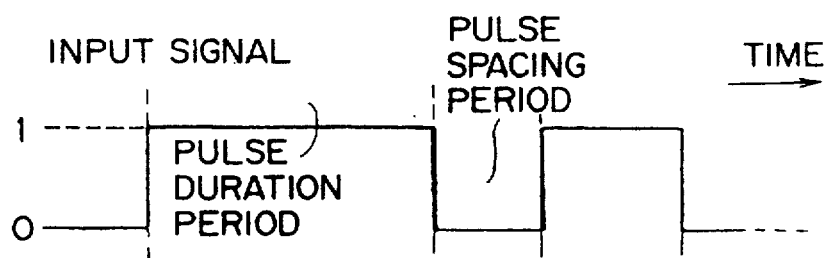
FIGS. 1(a), 1(b) and 1(c) are waveform diagrams showing recording waveforms according to the present invention.
Figure 1B:
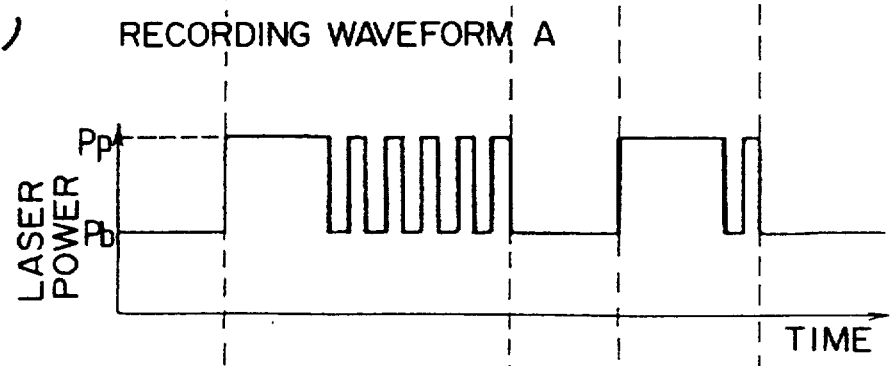
Figure 1C:
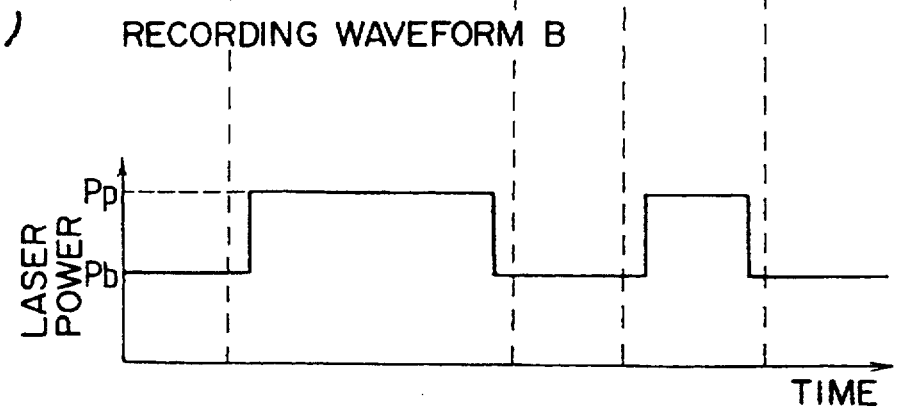

For example, when an EFM signal is used as an input recording signal having pulse duration periods and pulse spacing periods as shown in FIG. 1(a), in the case where the linear velocity of the optical disc is lower than a predetermined value L0, the pulse duration period of the input signal is converted into a modulation pattern for modulating the laser output power waveform into a short-width pulse string as shown in FIG. 1(b) (hereinafter, the short-width converted pulse string waveform will be represented as a "recording waveform A"); and in the case where the linear velocity of the optical disc is higher than the predetermined value L0, the pulse duration period of the input signal is converted into a modulation pattern for modulating the laser output power waveform into a pulse having its total width slightly shortened as shown in FIG. 1(c) (hereinafter, this slightly shortened pulse width waveform will be represented as "recording waveform B"), so that the optimum modulated laser power pulse is selectively applied onto the optical disc for forming recording marks.

Next, the present invention is described in conjunction with their embodiments.

Embodiment 1

First, in a recording and playback operation using a phase-change type optical disc, the correlation between the linear velocity and the playback waveform distortion was determined by changing the linear velocity and the recording waveform of the laser output pulse in various values.

Figure 2:
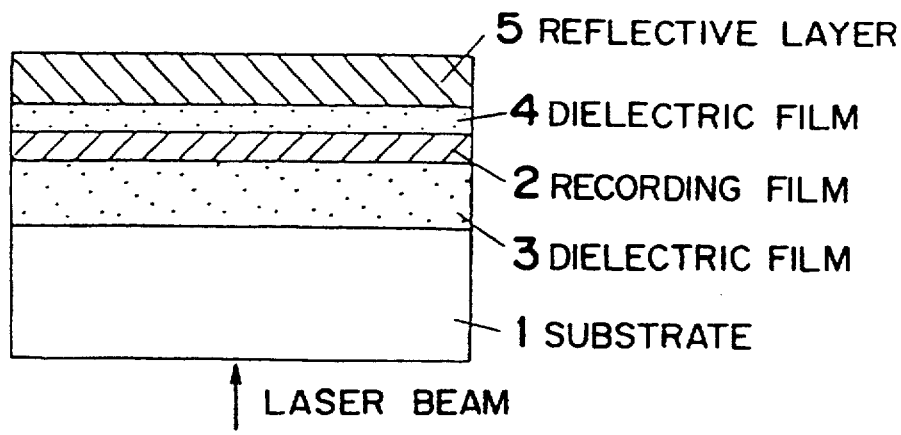
FIG. 2 is a sectional view of an optical disc used in the embodiments of the invention.

FIG. 2 shows a construction of the optical disc used in the experiment.

Referring to FIG. 2, a substrate 1 is made of plastic material such as polycarbonate, having a diameter of 200 mm, which is provided with tracks for signal recording. A recording thin film 2 is made from three elements such as GeSbTe, which is 20 nm in thickness. As a pair of protector films, lower and upper dielectric films 3 and 4 made of ZnS material are provided below and above the recording film 2 respectively, where the lower dielectric film 3 on the substrate 1 is 150 nm in thickness and the upper dielectric film 4 on the recording film 2 is 15 nm in thickness. On the upper dielectric film 4, there is provided a reflective film 5 which is made of metal material such as Au, having a thickness of 50 nm. Thus, the entire part of the recording film 2 of the optical disc was previously crystallized to have a signal-erased state and thereafter subjected to laser irradiation so that the laser irradiated portion of the crystallized film 2 is changed into an amorphous state due to the thermal effect of the laser beam, changing the reflectance thereof. Thus, a recording signal was recorded as an amorphous recording mark by means of laser irradiation.

The linear velocity of the optical disc was selected among four values: 1.5 m/s, 3 m/s, 6 m/s, and 9 m/s, by changing its rotating speed.

As a recording input signal, an EFM signal was adopted. Then, a semiconductor laser was driven in combination of three ways for recording the input signal. (1) When the first driving way is selected, the laser output power is directly modulated with the EFM input waveform. It is noted here that this direct modulation waveform is denoted as "a recording waveform C". (2) In the second driving way, the laser output power is modulated by correcting the input waveform into a short-width pulse string as represented by a recording waveform A. (3) In the third driving way, the laser output power is modulated by correcting the input waveform into a slightly shortened waveform in total pulse width as represented by a recording waveform B.

FIGS. 3(a) through 3(d) show examples of the recording waveforms adopted in the present embodiment.

FIG. 3(a) shows an example of an input waveform of the EFM signal having pulse duration periods of 8 T and 4 T and a pulse spacing period of 3 T, where T denotes a clock period for defining a pulse width. FIG. 3(b) shows a recording waveform C of the laser output power obtained by directly modulating the laser power in accordance with the input waveform of the EFM signal. FIG. 3(c) shows a recording waveform A, where the pulse width of the leading head pulse in the short-pulse string was set to 1.5 T, and the width and interval of each of the succeeding pulses were both set to 0.5 T. Accordingly, the clock period of this recording waveform A is 0.5 T, requiring a clock frequency two times larger than the frequency of the EFM signal. Further, FIG. 3(d) shows a recording waveform B, where the width of each of the recording pulses was made slightly shorter than that of the EFM input signal pulse by a clock period T.

It is to be noted that the clock frequency of the EFM signal was changed in proportion to the linear velocity of the disc so that the length of the recorded mark remains unchanged even if the linear velocity of the disc is changed. In specific, the clock frequency was set to 4.3 MHz for 1.5 m/s of the linear velocity, 8.6 MHz for 3 m/s, 17.2 MHz for 6 m/s, and 25.8 MHz for 9 m/s.

The recorded signal was reproduced and the magnitude of the distortion of the playback waveform was determined. Quantitative evaluation of the distortion of the playback waveform was made by binary-digitizing the playback waveform previously and then entering binary-digitized waveform into a time-interval analyzer (not shown), where the amount of jitter (nsec.) was determined as a phase margin. The greater the phase margin, the smaller the shift amount between the front and rear edge positions of the recorded mark, and accordingly reducing the distortion of the recording mark.

Figure 4:
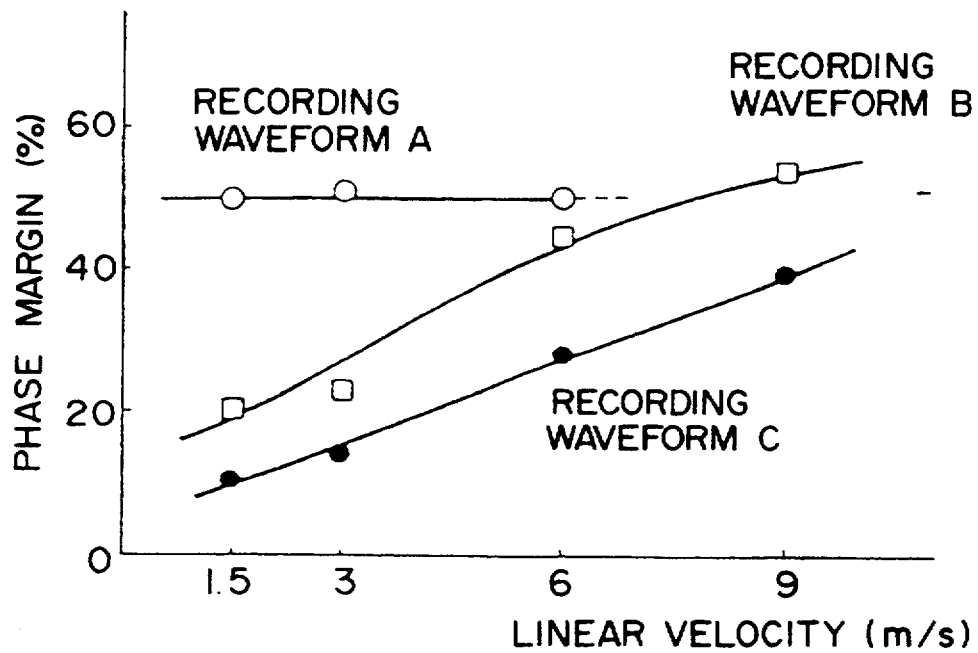
FIG. 4 is a graph showing the relationship between the linear velocity and the phase margin in the case where a plurality of recording waveforms are adopted.
Figure 5:
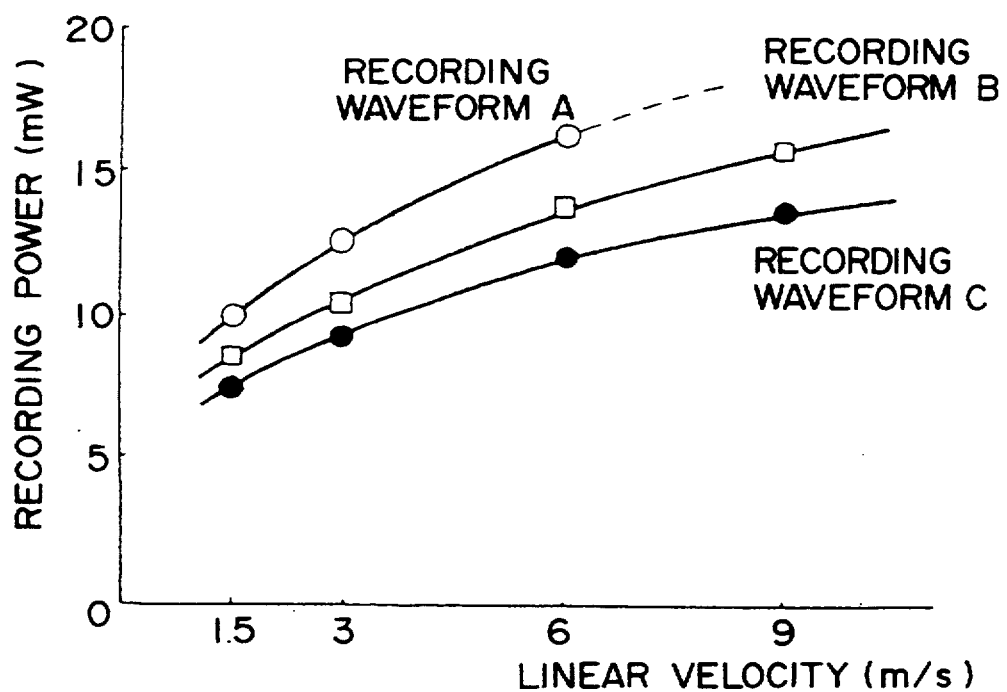
FIG. 5 is a graph showing the relationship between the linear velocity and the recording power in the case where a plurality of recording waveforms are adopted.

FIG. 4 shows the correlation between the maximum phase margin and the linear velocity of the optical disc under various laser irradiation conditions, and FIG. 5 shows the resulting correlation between the recording laser power (on the disc surface of the optical disc) and the linear velocity under the same conditions. It is to be noted that the erasing laser power is made constant for each linear velocity, regardless of any differences among all the recording waveforms.

As apparent from FIG. 4, in the case where the recording waveforms B or C are used, the higher the linear velocity, the greater the phase margin. This means that, in a method of forming a recording mark with a single pulse, the lower the linear velocity is, the greater the distortion of the recorded mark results, and therefore the distortion of the playback waveform results in greater. In this connection, the phase margin is larger in recording waveform B than in recording waveform C. This is attributed to the fact that, in an overwrite operation, the recording film 2 is irradiated with a higher-level laser power than the erasing level so as to be normally preheated. Accordingly, the recording mark results in a longer length in the track direction than the recording pulse width. In other words, in order to obtain a recording mark of a desired length, it is preferable to apply recording pulses for irradiation shorter than the desired length.

When the recording waveform A is selectively used, the phase margin is nearly constant independently of variation of the linear velocity. In specific, a greater phase margin is obtained even for lower linear velocities than the case of using the recording waveforms B or C. This means the fact that the recording waveform A is superior to the recording waveforms B and C in the lower linear velocity range. However, as the linear velocity increases, the phase margin in recording waveform A and that in recording waveform B approximate to each other, almost equal at a linear velocity of 6 m/s. It is to be noted that, at a linear velocity of 9 m/s, the clock frequency of the waveform correction circuit for converting an input waveform into a recording waveform A was so high that the recording and playback operation in the recording waveform A was not effected.

As shown in FIG. 5, the recording power increases in the order of the recording waveforms C, B, and A. Referring to the recording waveform A, since the energy to be imparted to the recording film is given in the form of short-pulse string, therefore a greater recording laser power is required. That is, when selectively using the recording waveform A, especially at higher linear velocities, a semiconductor laser having greater output power is required as a laser light source.

As described above, according to FIGS. 4 and 5, in the arrangement of the present embodiment, the recording waveform A is superior to the others in a range where the linear velocity is lower than about 6 m/s, and the recording waveform B is superior in a range where the linear velocity is higher than about 6 m/s. Accordingly, it has been found that, it is desirable to detect the linear velocity of the optical disc and, according to the detected result of the linear velocity, the recording waveform correction circuit means are selectively switched in terms of the phase margin, system construction, recording sensitivity, and the like.

Modified Examples

Alternatively, as shown in FIGS. 6(a) and 6(b), in the case of using a recording waveform D where the laser output power waveform is provided with a lower bottom level Pr for thermal isolation which is made lower than the erasing level Pb immediately before and behind the recording pulse string of the recording waveform A of FIG. 3. By this way, it becomes possible to suppress a thermal interference phenomenon by the lowered laser power bottoms such that, in implementing recording with narrowed mark intervals, the heat in the region irradiated with the recording power is diffused backward so that the succeeding recording mark is written in a greater shape than the desired one. Thus, the lowered laser power bottom portions Pr in the waveform D serve as thermal isolation in this arrangement, which is effective especially in widening the phase margin.

If the period $\tau$ of the laser power bottom level Pr during which the laser power is made lower than the erasing level was too long, the recording film would not reach a temperature higher than the crystallizing temperature thereof, which causes an unerased portion to occur. However, if the period $\tau$ of the bottom level Pr during which the laser power is made lower than the erasing level is in the range of $\tau \leq \lambda / V$ ($\lambda$: laser wavelength; V: relative velocity between optical disc and laser spot), irradiation of a laser beam is effected overlappingly between the erasing level Pb and the recording level Pp before and behind the period $\tau$. Moreover, conducted heat is derived from the region irradiated with the laser power levels of both Pb and Pp before and behind the period $\tau$, increasing the temperature of the recording film, so that the recording film can reach the crystallizing temperature, thereby suppressing the unerased portion.

Although, in the case of using the recording waveform D, the laser power bottom level Pr was made lower than the erasing level Pb both before and behind the recording pulse string, yet doing so either before or behind solely can afford a substantial effect. Also, the laser power bottom level Pr lower than the erasing level Pb may be a reproducing power level or a laser-off level, allowing the system construction to be simplified.

Further, in a similar manner, even when using the recording waveforms B and C as shown in FIGS. 3(d) and 3(b), it is possible to provide a bottom level Pr lower than the erasing level before and/or behind the pulse duration periods of recording power level in the waveform B.

Still, FIG. 6(b) shows a case of selecting a recording waveform E where the recording waveform A in FIG. 3 is modulated in a range between the recording power level and the reproducing power level (or laser-off level) for the period matching the recording pulse string. By this method, the recording film is rapidly cooled after melting at the entire recorded mark portion, so that a stable recorded mark can be formed, which is effective in widening the phase margin.

Furthermore, as shown in FIG. 4, even with recording waveform C, a satisfactory phase margin can be obtained in a range where the linear velocity is high. Accordingly, the signal recording may be implemented in such a way that in the range where the linear velocity is high, the laser power is directly modulated in accordance with the input pulse signal, and, in the range where the linear velocity is low, the input signal is converted into a multiple-pulse string as represented by a recording waveform A and thereafter the laser power is modulated in accordance with the pulse string waveform. In this case, when the linear velocity is high, no waveform converting circuit is required, allowing the system construction to be simplified.

Furthermore, in the present embodiment, a method has been described by way of waveform correction means in which, in a region where the linear velocity is low, the recording pulse is corrected in waveform into a short-pulse string formed of a plurality of short-width pulses for recording the signal, while in a range where the linear velocity is high, the recording pulse is corrected in waveform into slightly shorter one for recording the signal. However, it is to be noted that the optimum waveform correction means may differ depending on the structure of the optical disc or the type of the recording medium, and therefore waveforms as shown in the first and second Embodiments are not always the optimum correction.

For example, depending on the conditions, another method may be adopted in which the recording pulse is corrected in waveform into a pulse string formed of a plurality of short-width pulses regardless of the linear velocity, and the width of the leading pulse in the converted short pulse string is changed between the regions where the linear velocity is high and low, for example, wider in the region where the linear velocity is high, whereby the phase margin can be enlarged all over the regions of the optical disc. Such correction methods are also included in the scope of the present invention.

For further example, depending on the conditions, another method may be adopted in which the recording pulse is corrected in waveform into a pulse string formed of a plurality of short-width pulses regardless of the linear velocity, and the pulse width of the converted short pulse string is changed between the regions where the linear velocity is high and low.

For example, in another correction method, a recording waveform F as shown in FIG. 8(a) is used in the region where the linear velocity is low, while a recording waveform G as shown in FIG. 8(b) (which is obtained by widening each pulse width of the short-pulse string in the waveform F) is used in the region where the linear velocity is high. Since the thermal accumulation effect is decreased with increment of the linear velocity in the recording mode, the tear-like distortion in the recorded mark is suppressed even when the pulse width of the short-pulse string is made wider. Moreover, since the thermal energy to be supplied to the recording film is increased with wider pulse width of the short-pulse string, therefore the recording laser output power can be reduced lower than the case where the pulse width is narrow.

It is to be noted that the waveforms A through G may be used in appropriate combination in various ways depending on the structure of the optical disc or the type of the recording medium.

Embodiment 2

An optical recording system employing the modulation method according to the present invention is described hereinbelow in connection with FIG. 7.

Figure 7:
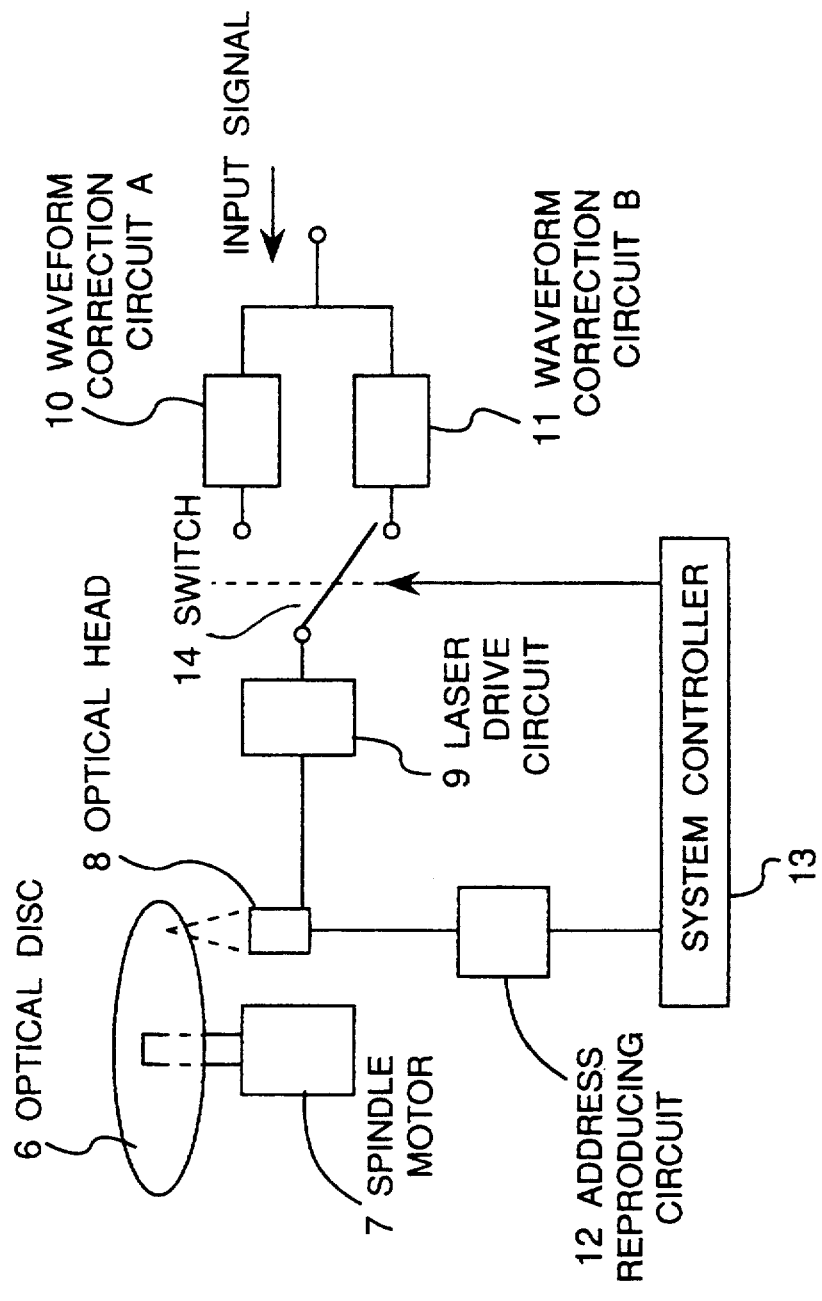
FIG. 7 is a schematic view showing an optical recording system according to the present invention.
Figure 9A:
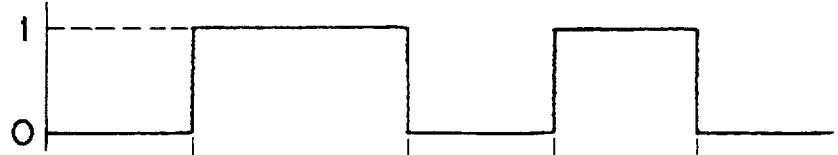
FIGS. 9(a), 9(b), 9(c) and 9(d) are diagrams for explaining a conventional recording method.
Figure 9B:
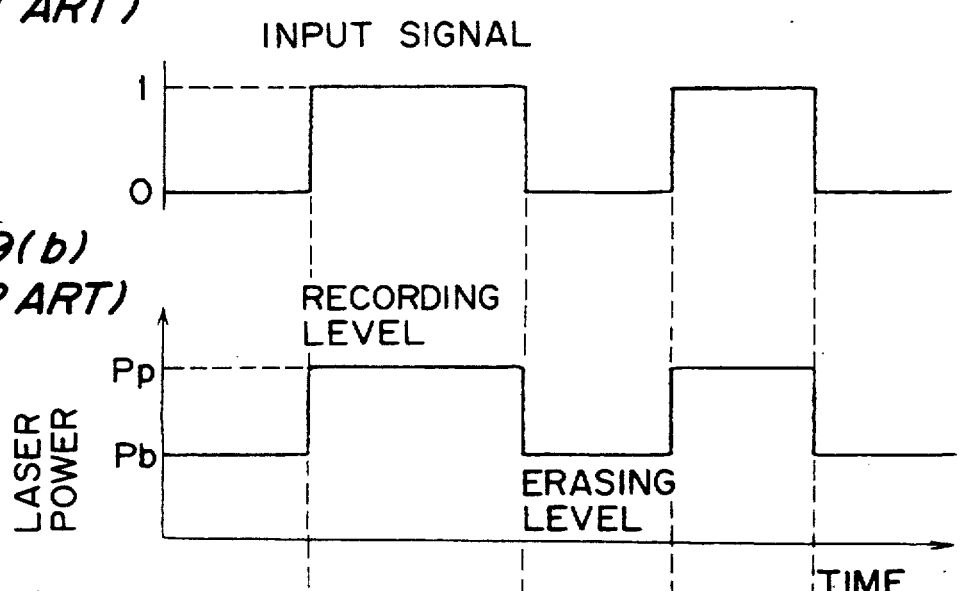
Figure 9C:
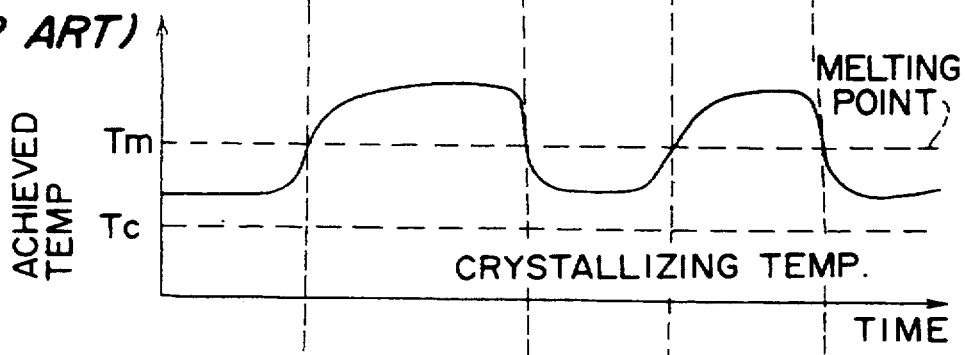
Figure 9D:
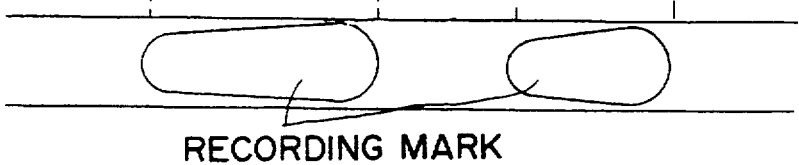
Figure 10A:
FIGS. 10(a), 10(b), 10(c) and 10(d) are diagrams for explaining another conventional recording method.
Figure 10B:
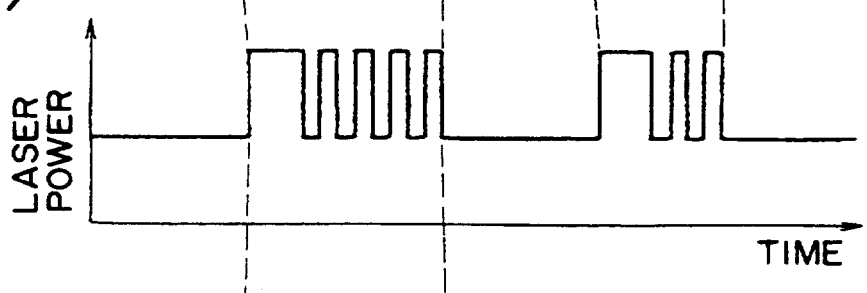
Figure 10C:
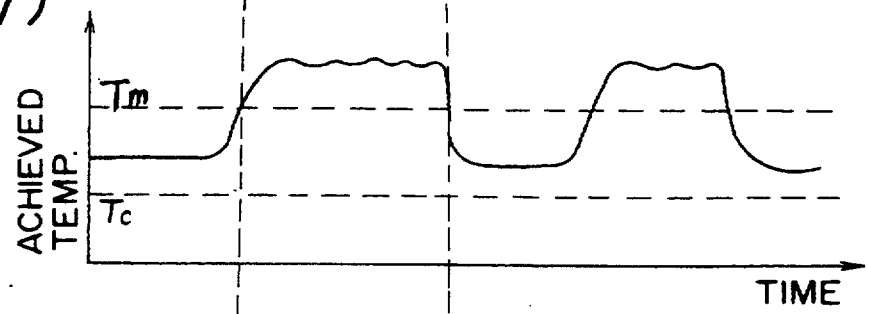
Figure 10D:
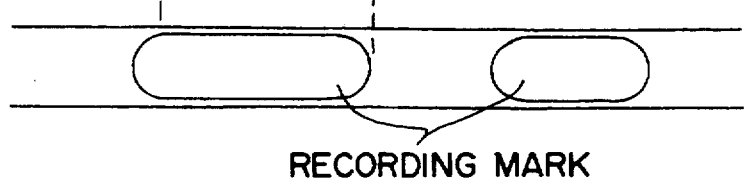

Referring to FIG. 7, an optical recording disc 6 is mounted on a spindle motor 7, which is rotated at a constant rotating speed (i.e., constant angular velocity). In this embodiment, the optical disc 6 has the same structure as shown in FIG. 2 described in the first Embodiment. An optical head 8 focuses a laser beam to form a laser beam spot on the optical disc through a collimator lens (not shown), an objective lens (not shown), and the like. The laser beam is generated from a semiconductor laser used as a light source and fed to the optical head 8. The semiconductor laser is driven by a laser drive circuit 9. In a recording mode for recording an input signal in the system, the input signal waveform having pulse duration periods and pulse spacing periods as shown in FIG. 3(a) is corrected by either a waveform correction circuit A (10) or a waveform correction circuit B (11) and thereafter delivered to the laser driving circuit 9.

In this embodiment, an EFM signal is used as the input signal, and the waveform correction circuit A (10) has such a circuit arrangement that the EFM input signal is converted into a multiple-short-pulse string. The practical circuit configuration of the correction circuit A is disclosed, e.g., in the U.S. Pat. No. 5,109,373. When the laser drive circuit 9 is driven in accordance with the short-pulse string waveform obtained by correction through the waveform correction circuit A (10), a recording waveform A as shown in FIG. 3(c) is obtained by modulating the laser output power in accordance with the short-pulse string waveform. On the other hand, the waveform correction circuit B (11) has such a circuit arrangement that the EFM input signal is converted into a pulse slightly shortened in width to obtain a waveform B as shown in FIG. 3(d). That is, when the laser drive circuit 9 is driven in accordance with the slightly shortened pulse in width obtained by correction through the waveform correction circuit B (11), a recording waveform B modulated as shown in FIG. 3(d) is obtained as the laser output power waveform. The waveform correction circuit B can be made up of a delay element and an AND circuit. In other words, by passing the input signal through the delay element and thereafter obtaining "AND" (logical product) of the delayed result with the original input signal, the recording waveform B as shown in FIG. 3(d) can be obtained.

In this embodiment of the recording system, the linear velocity at the laser beam spot irradiated portion of the optical disc is obtained in a following manner as to be explained below. In a recording mode of the system, first the optical disc surface is irradiated with a laser beam spot by means of the optical head 8 in response to the output of the laser drive circuit 9. Then the address signal previously provided to the signal track provided on the recording film 2 (see FIG. 2) is read by means of an address reproducing circuit 12 through the optical head 8. Subsequently, the linear velocity at the laser spot irradiated portion is calculated by means of a system controller 13 in accordance with the address signal reproduced by the address reproducing circuit 12. If the calculated linear velocity is smaller than a predetermined reference value, the system controller 13 sends an instruction signal to a switch 14 to select the waveform correction circuit A as the waveform correction means. Conversely, if the linear velocity is greater than the predetermined reference value, the system controller 13 sends an instruction signal to the switch 14 to select the waveform correction circuit B as the waveform correction means.

Therefore, according to the embodiment of the recording system, it is possible to readily provide a recording system which has a wide phase margin all over the regions of the optical disc, by taking advantage of the results shown in FIGS. 4 and 5 described in the first Embodiment.

Although two waveform correction circuits A and B are used as the waveform correction means in this embodiment, it is also possible to further use a plurality of waveform correction means of different types.

As described above, according to the method and system for recording optical information of the present invention, there can be formed satisfactory recording marks with less-distorted all over the regions of the optical disc by a simple system construction, allowing the jitter of playback waveform to be suppressed. This contributes to reduction in error rate of the optical disc, making it feasible to enlarge the recording capacity of the optical discs.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A method of recording optical information in which a digital signal corrected by modulation in pulse width is overwritten onto an optical information recording medium having its optically discriminatable states reversibly changed by irradiation with a single laser beam spot to form recording marks corresponding to the input signal, comprising the steps of:
    selecting one of correcting ways for correcting the pulse waveform of the input signal to be recorded, depending on change in relative velocity between the optical information recording medium and the laser beam spot; and
    modulating the laser beam output power in a range between an erasing level and a recording level in accordance with the corrected pulse waveform of the modulated input signal,
    wherein when the relative velocity is lower than a predetermined value, a recording pulse for forming one recording mark is corrected in waveform into a pulse string having a plurality of short-width pulses before modulating the laser output power, while when the relative velocity is higher than the predetermined value, the laser output power is modulated directly in accordance with the original input signal.

2. A method of recording optical information in which a digital signal corrected by modulation in pulse width is overwritten onto an optical information recording medium having its optically discriminatable states reversibly changed by irradiation with a single laser beam spot to form recording marks corresponding to the input signal, comprising the steps of:
    selecting one of correcting ways for correcting the pulse waveform of the input signal to be recorded, depending on change in relative velocity between the optical information recording medium and the laser beam spot; and
    modulating the laser beam output power in a range between an erasing level and a recording level in accordance with the corrected pulse waveform of the modulated input signal,
    wherein when the relative velocity is lower than a predetermined value, a recording pulse for forming one recording mark is corrected in waveform into a pulse string having a plurality of short-width pulses before modulating the laser output power, while when the relative velocity is higher than the predetermined value, a recording pulse for forming one recording mark is corrected in waveform into a slightly shorter pulse in width before modulating the laser output power.

3. A method of recording optical information in which a digital signal corrected by modulation in pulse width is overwritten onto an optical information recording medium having its optically discriminatable states reversibly changed by irradiation with a single laser beam spot to form recording marks corresponding to the input signal, comprising the steps of:

selecting one of correcting ways for correcting the pulse waveform of the input signal to be recorded, depending on change in relative velocity between the optical information recording medium and the laser beam spot; and modulating the laser beam output power in a range between an erasing level and a recording level in accordance with the corrected pulse waveform of the modulated input signal, wherein, before modulating the laser output power, a recording pulse for forming one recording mark is corrected in waveform into a pulse string having a leading pulse and a plurality of succeeding short-width pulses in a possible range of the relative velocity, and wherein the pulse width of each succeeding pulse is made wider with the relative velocity being higher.

4. The method of recording optical information as claimed in claim 1, wherein the pulse string formed of a plurality of short-width pulses has a leading pulse and a succeeding pulse string, the width of the leading pulse being constant regardless of the length of the recording mark and greater than the width of each pulse of the succeeding pulse string, the narrow pulses contained in the succeeding pulse string being equal to one another in width and in interval respectively, and when forming a recording mark of n-th shortest entry in length, the number of narrow pulses contained in the succeeding pulse string being n-1, wherein n is an integer.

5. The method of recording optical information as claimed in claim 2, wherein the pulse string formed of a plurality of short-width pulses has a leading pulse and a succeeding pulse string, the width of the leading pulse being constant regardless of the length of the recording mark and greater than the width of each pulse of the succeeding pulse string, the narrow pulses contained in the succeeding pulse string being equal to one another in width and in interval respectively, and when forming a recording mark of n-th shortest entry in length, the number of narrow pulses contained in the succeeding pulse string being n-1, wherein n is a positive integer.

6. The method of recording optical information as claimed in claim 1, wherein the laser output power is made lower than the erasing level during a predetermined period at least either before or after irradiation of a laser beam to form one recording mark.

7. The method of recording optical information as claimed in claim 2, wherein the laser output power is made lower than the erasing level during a predetermined period at least either before or after irradiation of a laser beam to form one recording mark.

8. The method of recording optical information as claimed in claim 6, wherein the laser output power is made lower than the erasing level during a predetermined period at least either before or behind the pulse string formed of a plurality of short-width pulses.

9. The method of recording optical information as claimed in claim 7, wherein the laser output power is made lower than the erasing level during a predetermined period at least either before or behind the pulse string formed of a plurality of short-width pulses.

10. The method of recording optical information as claimed in claim 7, wherein the power level lower than the erasing level is set to a reproducing power level.

11. The method of recording optical information as claimed in claim 7, wherein the power level lower than the erasing level is set to a laser-off level.

12. The method of recording optical information as claimed in claim 1, wherein during a period matching the pulse string formed of a plurality of short-width pulses, the laser output power is modulated in a range between a recording power level and a reproducing power level.

13. The method of recording optical information as claimed in claim 1, wherein during a period matching the pulse string formed of a plurality of short-width pulses, the laser output power is modulated in a range between a recording power level and a laser-off level.

14. The method of recording optical information as claimed in claim 2, wherein during a period matching the pulse string formed of a plurality of short-width pulses, the laser output power is modulated in a range between a recording power level and a reproducing power level.

15. The method of recording optical information as claimed in claim 2, wherein during a period matching the pulse string formed of a plurality of short-width pulses, the laser output power is modulated in a range between a recording power level and a laser-off level.

16. A method of recording optical information in which a digital signal corrected by modulation in pulse width is overwritten onto an optical information recording medium having its optically discriminatable states reversibly changed by irradiation with a single laser beam spot to form recording marks corresponding to the input signal, comprising the steps of:

selecting one of correcting ways for correcting the pulse waveform of the input signal to be recorded, depending on change in relative velocity between the optical information recording medium and the laser beam spot; and modulating the laser beam output power in a range between an erasing level and a recording level in accordance with the corrected pulse waveform of the modulated input signal, wherein, before modulating the laser output power, a recording pulse for forming one recording mark is corrected in waveform into a pulse string having a leading pulse and a plurality of succeeding pulses wherein as the linear velocity becomes higher, the ratio of the pulse width of the leading pulse to the pulse width of each succeeding pulse is made larger.

17. A method of recording optical information in which a digital signal corrected by modulation in pulse width is overwritten onto an optical information recording medium having its optically discriminatable states reversibly changed by irradiation with a single laser beam spot to form recording marks corresponding to the input signal, comprising the steps of:

selecting one of correcting ways for correcting the pulse waveform of the input signal to be recorded, depending on change in relative velocity between the optical information recording medium and the laser beam spot; and modulating the laser beam output power in a range between an erasing level and a recording level in accordance with the corrected pulse waveform of the modulated input signal, wherein, before modulating the laser output power, a recording pulse for forming one recording mark is corrected in waveform into a pulse string having a leading pulse and a plurality of succeeding pulses wherein as the linear velocity becomes higher, the ratio of the total laser light emitting time in a pulse string period is increased, the pulse string period being defined as a sum of periods of the leading pulse and the succeeding pulses.

* * * * *